(12) United States Patent
Li et al.

(10) Patent No.: US 9,379,952 B2
(45) Date of Patent: Jun. 28, 2016

(54) MONITORING NAT BEHAVIORS THROUGH URI DEREFERENCES IN WEB BROWSERS

(71) Applicant: Futurewei Technologies, Inc., Plano, TX (US)

(72) Inventors: Li Li, Bridgewater, NJ (US); Tao Cai, Shenzhen (CN); Wu Chou, Basking Ridge, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 499 days.

(21) Appl. No.: 13/970,882

(22) Filed: Aug. 20, 2013

(65) Prior Publication Data

US 2015/0058469 A1 Feb. 26, 2015

(51) Int. Cl.
 G06F 15/173 (2006.01)
 H04L 12/26 (2006.01)
 H04L 29/12 (2006.01)
 H04L 29/08 (2006.01)

(52) U.S. Cl.
 CPC ............ *H04L 43/08* (2013.01); *H04L 61/2575* (2013.01); *H04L 67/02* (2013.01); *H04L 61/2514* (2013.01)

(58) Field of Classification Search
 CPC ..... H04L 43/08; H04L 61/2575; H04L 67/02; G06F 17/30861
 USPC ........................................................ 709/224
 See application file for complete search history.

(56) References Cited

U.S. PATENT DOCUMENTS

| 8,978,126 B2 * | 3/2015 | Preiss ................... | H04L 63/029 726/14 |
| 2005/0108430 A1 * | 5/2005 | Howarth ............... | H04L 63/083 709/245 |

(Continued)

FOREIGN PATENT DOCUMENTS

| CN | 1747457 A | 3/2006 |
| CN | 1893391 A | 1/2007 |

OTHER PUBLICATIONS

Foreign Communication From a Counterpart Application, PCT Application No. PCT/CN2014/084602, International Search Report dated Nov. 19, 2014, 7 pages.

(Continued)

*Primary Examiner* — Kevin Bates
*Assistant Examiner* — Ronak Patel
(74) *Attorney, Agent, or Firm* — Conley Rose, P.C.; Grant Rodolph; Jonathan K. Polk

(57) ABSTRACT

A method comprising dereferencing, in a web browser, a Uniform Resource Identifier (URI) comprising a web resource and a reflex tag, creating a request message comprising a request for the web resource and a reflex request corresponding to the reflex tag, wherein the reflex request is a request for address and port information from a web server comprising the web resource, encapsulating the request message in a transport message comprising an Internet Protocol (IP) address and a port of the web browser, transmitting the transport message to the web server, receiving a response message from the web server, wherein the response message comprises a second IP address and a second port number of the browser as seen by the web server, and determining a characteristic of at least one Network Address Translation (NAT) device coupled between the web browser and the web server based on the second IP address and second port number.

20 Claims, 6 Drawing Sheets

(56) References Cited

U.S. PATENT DOCUMENTS

| | | | | |
|---|---|---|---|---|
| 2006/0112174 | A1* | 5/2006 | L'Heureux | H04L 67/2804 709/223 |
| 2007/0076729 | A1* | 4/2007 | Takeda | H04L 61/2564 370/401 |
| 2007/0153812 | A1* | 7/2007 | Kemp | H04L 29/12509 370/401 |
| 2007/0180081 | A1* | 8/2007 | Okmianski | H04L 29/1249 709/223 |
| 2008/0080508 | A1* | 4/2008 | Das | H04L 12/4633 370/392 |
| 2009/0113460 | A1* | 4/2009 | Parrish | H04L 69/03 719/328 |
| 2009/0216887 | A1* | 8/2009 | Hertle | H04L 29/125 709/227 |
| 2010/0217837 | A1* | 8/2010 | Ansari | G06Q 30/04 709/218 |
| 2012/0072548 | A1* | 3/2012 | Kim | H04L 61/1535 709/219 |
| 2012/0254362 | A1* | 10/2012 | Li | H04W 4/025 709/218 |
| 2013/0250037 | A1* | 9/2013 | Cipolli | H04N 7/152 348/14.09 |
| 2013/0258119 | A1* | 10/2013 | Kim | H04L 61/2514 348/207.1 |
| 2014/0222963 | A1* | 8/2014 | Gangadharan | H04L 65/1016 709/219 |
| 2015/0120879 | A1* | 4/2015 | Yoakum | G06F 17/30861 709/219 |

OTHER PUBLICATIONS

Foreign Communication From a Counterpart Application, PCT Application No. PCT/CN2014/084602, Written Opinion dated Nov. 19, 2014, 5 pages.

Fielding, R., et al. "Hypertext Transfer Protocol—HTTP/1.1," Network Working Group, Standards Track, RFC 2616, Jun. 1999, 177 pgs.

Saint-Andre, P., Ed. "Extensible Messaging and Presence Protocol (XMPP): Core," Network Working Group, Standards Track, RFC 3920, Oct. 2004, 91 pgs.

Audet, F., Ed. et al. "Network Address Translation (NAT) Behavioral Requirements for Unicast UDP," Network Working Group, Best Current Practice, RFC 4787, Jan. 2007, 29 pgs.

Rosenberg, J. "Interactive Connectivity Establishment (ICE): A Protocol for Network Address Translator (NAT) Traversal for Offer/Answer Protocols," Internet Engineering Task Force (IETF), Standards Track, RFC 5245, Apr. 2010, 118 pgs.

Guha, S., Ed. et al. "NAT Behavioral Requirement for TCP," Network Working Group, Best Current Practice, RFC 5382, Oct. 2008, 22 pgs.

Rosenberg, J., et al. "Session Traversal Utilities for NAT (STUN)," Network Working Group, Standards Track, RFC 5389, Oct. 2008, 52 pgs.

Mahy, R., et al. "Traversal Using Relays around NAT (TURN): Relay Extensions to Session Traversal Utilities for NAT (STUN)," Internet Engineering Task Force (IETF), Standards Track, RFC 5766, Apr. 2010, 68 pgs.

MacDonald, D. et al. "NAT Behavior Discovery Using Session Traversal Utilities for NAT (STUN)," Internet Engineering Task Force (IETF), Experimental, RFC 5780, May 2010, 28 pgs.

Fette, I. et al. "The WebSocket Protocol," Internet Engineering Task Force (IETF), Standards Track, RFC 6455, Dec. 2011, 72 pgs.

Biggadike, A., et al. "NATBLASTER: Establishing TCP Connections Between Hosts Behind NATs," SIGCOMM Asia Workshop 2005, Beijing, China, 10 pgs.

Rosenberg, J. "Interactive Connectivity Establishment (ICE): A Protocol for Network Address Translator (NAT) Traversal for Offer/Answer Protocols draft-ietf-mmusic-ice-19," MMUSIC, Standards Track, Oct. 29, 2007, 119 pgs.

Guha, S., et al. "NUTSS: A SIP-Based Approach to UDP and TCP Network Connectivity," SIGCOMM 2004 Workshops, Portland, Oregon, USA, 6 pgs.

Downloaded from website: http://wwww3.org/TR/eventsource/ on Aug. 20, 2013, 25 pgs.

Eppinger, J. "TCP Connections for P2P Apps: A Software Approach to Solving the NAT Problem, "Carnegie Mellon University, Pittsburgh, PA, USA, Research Showcase, Paper 16, Jan. 2005, 9 pgs.

* cited by examiner

MONITORING NAT BEHAVIORS THROUGH URI DEREFERENCES IN WEB BROWSERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) networks allow a collection of computers and other devices to be communicatively coupled to each other using a private address space. Internet Protocol networks utilize the Internet to facilitate the sharing of resources amongst devices. In order to enable communication between devices within private and public networks, Network Address Translation (NAT) may be employed to translate between addresses in the private address space and addresses in the public address space.

Web Real-Time Communication (WebRTC) is an example of an IP application that includes real-time communication features such as voice and video chatting among web browser. In order to discover and traverse NAT, current WebRTC architecture requires the web browsers to implement certain Interactive Connectivity Establishment (ICE) network protocols and techniques such as Session Traversal Utilities for NAT (STUN) and Traversal Using Relays around NAT (TURN). STUN may allow a client to determine whether it is operating behind a NAT and to discover its public IP address that is allocated for User Datagram Protocol (UDP) connections to a remote host. Additionally, TURN may be an extension of STUN and may utilize intermediate nodes to serve as relays to allow communication between peers.

These protocols, however, may be inefficient in properly monitoring NAT behavior as they may not be supported by some networks, resulting in communication failures. For example, some firewalls may block STUN and UDP traffic for clients such as Skype and Google Talk. Additionally, the network protocols may not reuse web traffic generated by a browser for NAT discovery, thereby creating excess networking overhead. The dedicated STUN/TURN servers may be single points of failure, and it may be difficult to extend them to support other NAT discovery mechanisms (e.g., a P2P rendezvous). Furthermore, the protocols introduce a connectivity layer that may not follow the web architecture, in which the STUN and TURN servers do not return hypertext even though they can be identified by URI schemes. Thus, there is a need for NAT discovery mechanisms that address one or more of the aforementioned issues within the Web architecture.

SUMMARY

In one embodiment, the disclosure includes a method performed in a web browser, the method comprising dereferencing a Uniform Resource Identifier (URI) comprising a web resource and a reflex tag, creating a request message comprising a request for the web resource and a reflex request corresponding to the reflex tag, wherein the reflex request is a request for address and port information from a web server comprising the web resource, encapsulating the request message in a transport message comprising an Internet Protocol (IP) address and a port of the web browser, transmitting the transport message to the web server, receiving a response message from the web server, wherein the response message comprises a second IP address and a second port number of the browser as seen by the web server, wherein the second IP address and the second port number is the requested address and port information, and wherein the response message further comprises at least a part of the web resource, and determining a characteristic of at least one Network Address Translation (NAT) device coupled between the web browser and the web server based on the second IP address and the second port number.

In another embodiment, the disclosure includes a method performed in a web server, the method comprising receiving a transport message, wherein the transport message is an encapsulated request message, wherein the request message comprises a request for a web resource and a reflex request corresponding to a reflex tag from a web browser, and wherein the transport message comprises an IP address and a port number generated by at least one NAT device for the web browser, in response to receiving the request for the web resource, retrieving the web resource, in response to receiving the reflex request, inserting the IP address and the port number in a response message, wherein the response message further comprises at least a part of the web resource, and transmitting the response message to the web browser.

In yet another embodiment, the disclosure includes a computer program product comprising computer executable instructions stored on a non-transitory computer readable medium such that when executed by a processor cause a web browser to dereference a hyperlink identifying a web resource with a reflex tag, create a request message comprising a request for the web resource and a reflex request corresponding to the reflex tag, wherein the reflex request is a request for address and port information from a web server comprising the web resource, and encapsulate the request message in a transport message comprising an IP address and a port of the web browser, send the transport message to the web server, acquire a response message from the web server, wherein the response message comprises a second IP address and a second port number of the browser as seen by the web server, wherein the second IP address and the second port number is the requested address and port information, and wherein the response message further comprises at least a part of the web resource, and determine a presence of and a type of at least one NAT device coupled between the web browser and the web server based on the second IP address and the second port number.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
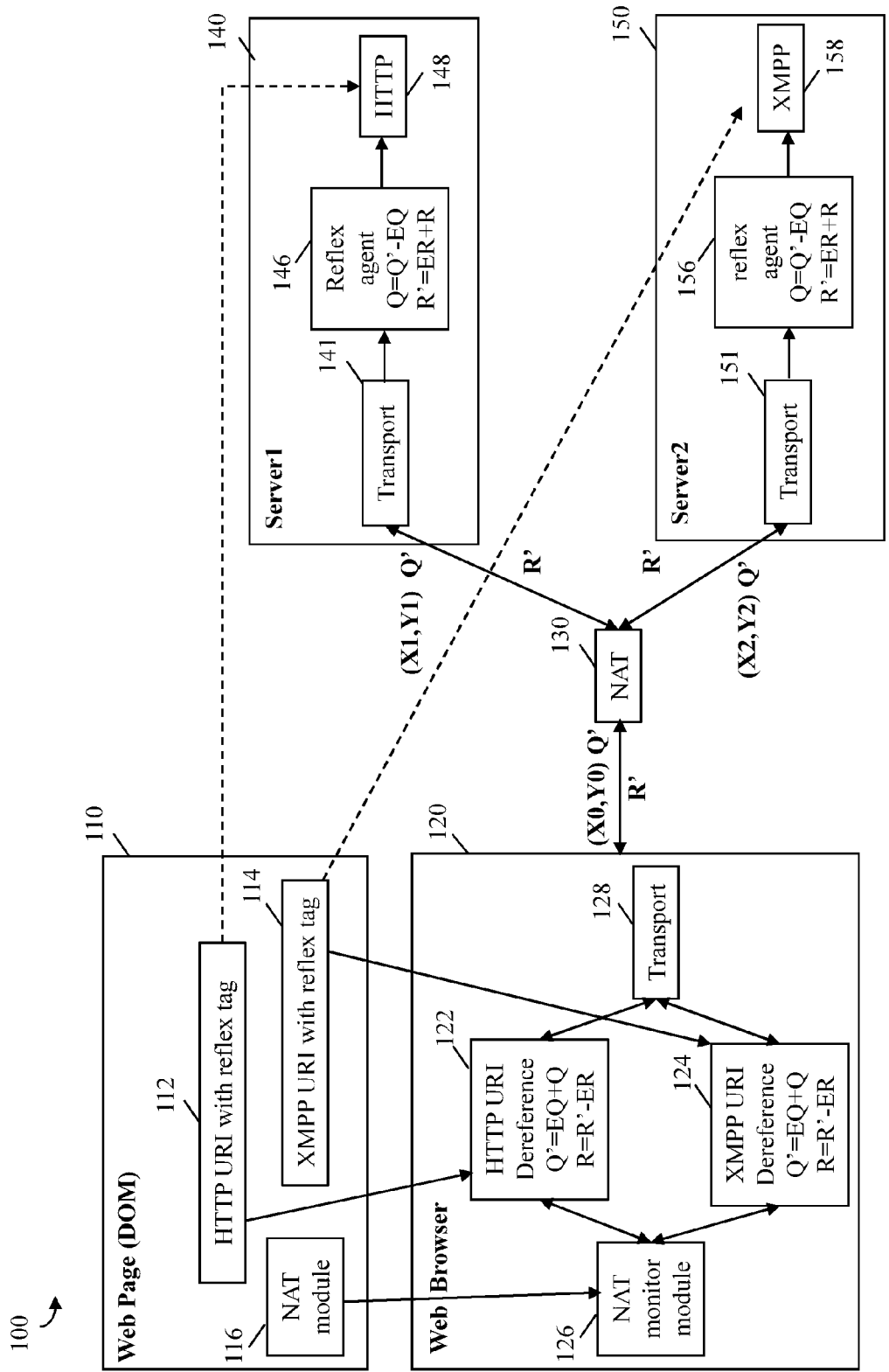
FIG. 1 is a schematic diagram of an embodiment of a network address translation (NAT) monitoring architecture.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Dereferencing a URI may refer to obtaining a resource identified by a specific URI. A URI dereference may represent a request from a web browser to a web server, which may be triggered by a mouse click or a keystroke as examples. Dereference protocols may comprise transaction, encryption (e.g., Transport Layer Security (TLS) protocols), authentication, authorization, message integrity, and redirection of these protocols.

During a session, a web browser may visit tens to hundreds of URI links for a Hypertext Markup Language (HTML) page automatically or in response to user actions. An HTML page may comprise several different components, such as one or more embedded images, embedded JavaScript (JS), and HTML elements. The web browser may make multiple requests to receive and load all these components, which may each have a corresponding URI. The constant Hypertext Transfer Protocol (HTTP) requests made by a browser may be related to the content of the page in displaying images and running code. The requests may also be for loading advertisements on a website or sending information to other tracking websites.

This process may be repeated each time a new web page is loaded. Links in an HTML page may point to different IP addresses, in which Transmission Control Protocol (TCP) or UDP transports may be employed. NAT behaviors may be the same for TCP and UDP. NAT mapping and filtering behaviors for TCP are classified in Request for Comment (RFC) memorandum 5382, entitled "NAT Behavioral Requirements for TCP", dated October 2008, which is incorporated herein by reference as if reproduced in its entirety. Similarly, NAT behavior for UDP is specified in RFC memorandum 4787, entitled "Network Address Translation (NAT) Behavioral Requirements for Unicast UDP", dated January 2007, which is incorporated herein by reference as if reproduced in its entirety. Since a web browser is continuously updating through UDP and TCP requests, it may be beneficial to utilize HTTP traffic from a browser for discovering and monitoring NAT behaviors. This approach may circumvent potential issues with traditional STUN and TURN protocols, such as unsupported networks, firewalls, as well as overhead challenges.

Disclosed herein are systems, methods, apparatuses, and computer program products for monitoring NAT behaviors through URI dereferences in web browser-based communication. URI dereference protocols may be reused in order to simplify the NAT discovery process without dedicated STUN or TURN servers, which may allow NAT detection and monitoring to become almost free of byproducts when a user browses the web. This approach may be achieved by implementing a new NAT discovery protocol. A new protocol, sometimes referred to herein as embedded STUN (E-STUN), may simplify NAT monitoring by integrating the protocol within a variety of URI dereference protocols, e.g., comprising HTTP 1.1 and Extensible Messaging and Presence Protocol (XMPP). A tag may be embedded in a URI to trigger a request for IP address and port information, as seen by a receiving web server, to be embedded in a web resource request message. The request message may traverse a Network Address Translation device, which affects the IP address and port information seen by the web server. By reusing existing HTTP and XMPP protocols, E-STUN embedded traffic may be able to go past firewalls which may block conventional NAT traversal protocols. In addition, NAT behavior may be monitored without creating extra costs to a browser or server, in order to detect NAT mapping or filtering changes which may occur in response to an increase in load or update in policy.

E-STUN services may be advertised explicitly in hypertext for URI authority in page and individual URI schemes, using a variety of HTML version 5 (HTML5) semantic tag mechanisms, including microdata (HTML5), Resource Description Framework in attributes (RDFa), microformat, and HTML5 rel attribute. In another embodiment, E-STUN services may be advertised implicitly by returning addresses automatically during URI dereferences. Furthermore, the E-STUN services may be incorporated with a server mechanism and/or a client mechanism to integrate the E-STUN protocol into the URI dereference process and monitor NAT behavior based on the data collected.

FIG. 1 is a schematic diagram of an embodiment of a NAT monitoring architecture 100. The architecture 100 may comprise a web page or domain (DOM) 110, web browser 120, Network Address Translation (NAT) device 130 (sometimes referred to as a NAT for short), HTTP server 140, and XMPP server 150. Although only one web browser, one web page, and two servers are shown for illustrative purposes, there may be any number of each component used in a networking system. The NAT device 130 may or may not be present. "NAT" stands for Network Address Translation, a process that can be implemented by one or more devices to perform network address translation. Thus, although one NAT device 130 is shown in FIG. 1 for illustrative purposes, a NAT process may be performed by a combination of two or more devices. Further, a NAT device may be referred to in some instances as a Network Address Translator. A web page 110 may be a regular HTML page with one or more URIs, such as an HTTP URI 112. The web page 110 may also employ another type of URI, such as an XMPP URI 114.

In an embodiment, a user may either invoke a URI link (e.g., corresponding to HTTP URI 112 or XMPP URI 114) or the link may point to a resource that is automatically downloaded by the browser 120. The link may go through a URI dereference process, by which the browser may send some messages to the server (e.g., server 1 140 or server 2 150) identified by the URI in order to obtain some data back (e.g., HTML, XML). The HTPP URI 112 and XMPP URI 114 may comprise a web resource and a tag, sometimes referred to herein as a reflex tag, that is used to invoke an E-STUN protocol. Potential syntax for reflex tags is disclosed herein. A reflex tag embedded in a URI may indicate a request for obtaining a translated IP address, if any, provided by a NAT in order to determine NAT behavior as disclosed herein, in addition to the conventional dereference protocol. Furthermore, the web page 110 may comprise a NAT module 116, which may use a JavaScript Application Programming Interface (API) to obtain NAT information.

A web browser 120 may display web page 110 and may comprise a NAT monitor module 126 and URI dereference modules 122 and 124 for HTTP and XMPP, respectively. As used herein, the term "module" preceded by a descriptor may refer to computer program instructions used to perform the descriptor. For example, a NAT monitor module may refer to computer program instructions used to perform NAT monitoring. The computer program instructions may be executed by a general-purpose processor to perform the indicated descriptor or function. Steps sufficient to implement the modules referenced herein are described herein.

A URI, such as HTTP URI 112 or XMPP URI 114, may be invoked. Upon invocation, the URI dereference module 122 may create a request message, denoted as Q in various figures. The request message may be a conventional HTTP request message. If the invoked URI comprises a reflex tag, the reflex tag may signal to the URI dereference module 122 to embed NAT behavior request message or syntax, denoted as EQ, in the request message Q. The NAT behavior request message may sometimes be referred to as an E-STUN request message. The combined request message, denoted as Q', may be transported via a transport module 128 using the TCP or UDP protocol.

The transport module 128 may receive transport (TCP or UDP) packets from the web browser 120 and send the packets to a web server through the NAT device 130. The NAT device 130 may perform address and port mapping for request and response messages Q' and R'. In another embodiment, the NAT device 130 may comprise a plurality of modules which are layered and conduct address translation. The NAT device 130 may not modify Q' or R' messages, except for the private browser IP address and port information for the web servers 140 and 150. (X0,Y0) may be a private IP address and port of the browser, which is unknown by a web server. Server 1 140 and server 2 150 may obtain translated browser IP addresses and port numbers, such as (X1,Y1) and (X2,Y2), respectively. The HTTP and XMPP servers 140 and 150, respectively, may receive requests from a web browser 120, with address and port information that has been translated by the NAT device 130.

After a URI dereference, a Q' request may reach a web server as directed by the URI. If the URI is an HTTP link, the request may go to HTTP server 140. If the URI is an XMPP link, the request may go to XMPP server 150. Each server may receive the request over a corresponding transport module 141 or 151 via TCP or UDP packets and may be directed by the address and port information provided by NAT device 130. The message may then be decoded by a reflex agent 146 or 156. The EQ portion of Q', which is the dereference message with embedded E-STUN, may be eliminated from the message, as denoted by Q=Q'-EQ. That is, the embedded message may be extracted in order to recover the regular message Q. The regular message Q may then be sent to an HTTP server 148 or an XMPP server 158.

During this task, the reflex agent 146 or 156 may record the reflex IP address from the public IP address from the NAT device 130. The aforementioned private IP address and port (X0,Y0) may be mapped by NAT device 130 to (X1,Y1) for HTTP server 140 or (X2,Y2) for XMPP server 150. The reflex agent 146 or 156 may not be aware of the mapping and may record the public IP address from the NAT device. When the conventional HTTP or XMPP processing is complete, the response R may be sent back to the reflex agent 146 or 156.

The reflex agent 146 or 156 may then insert the (X1,Y1) or (X2,Y2) IP address and port information into a response message, denoted as R'. The response message comprises a conventional server response message (e.g., containing data requested from the server) in which an IP address and port information as seen by the server is embedded into the conventional response. The conventional server response message is denoted as R, and the IP address and port information is denoted as ER.

The response message R' may then be sent from the web server(s) (140 and/or 150) back to the web browser 120 through the NAT device 130, wherein the response message contains (X1,Y1) or (X2,Y2) information. The response message may be sent to the URI dereference module (122 or 124 depending on whether the URI being dereferenced is HTTP or XMPP), which may take the response message and extract the IP address and port information from the message as denoted by R=R'-ER in FIG. 1. The ER information may contain the (X1,Y1) or (X2,Y2) IP address. The conventional response R may then be passed back to the web browser 120, e.g., for display. The NAT monitor module 126 may be employed to collect and analyze IP address and port information received from various servers, such as servers 140 and 150.

By embedding a new request message into a conventional URI request message, the web browser 120 may obtain information used to determine the presence and behavior of a NAT device. The dereference module 122 or 124 may send the (X1,Y1) or (X2,Y2) reflex IP address and port information to the NAT monitor module 126, which may collect multiple IP addresses from response messages from other web servers as well. Once the web browser 120 has collected enough IP addresses, the presence and type of NAT device may then be determined.

Figure 2:
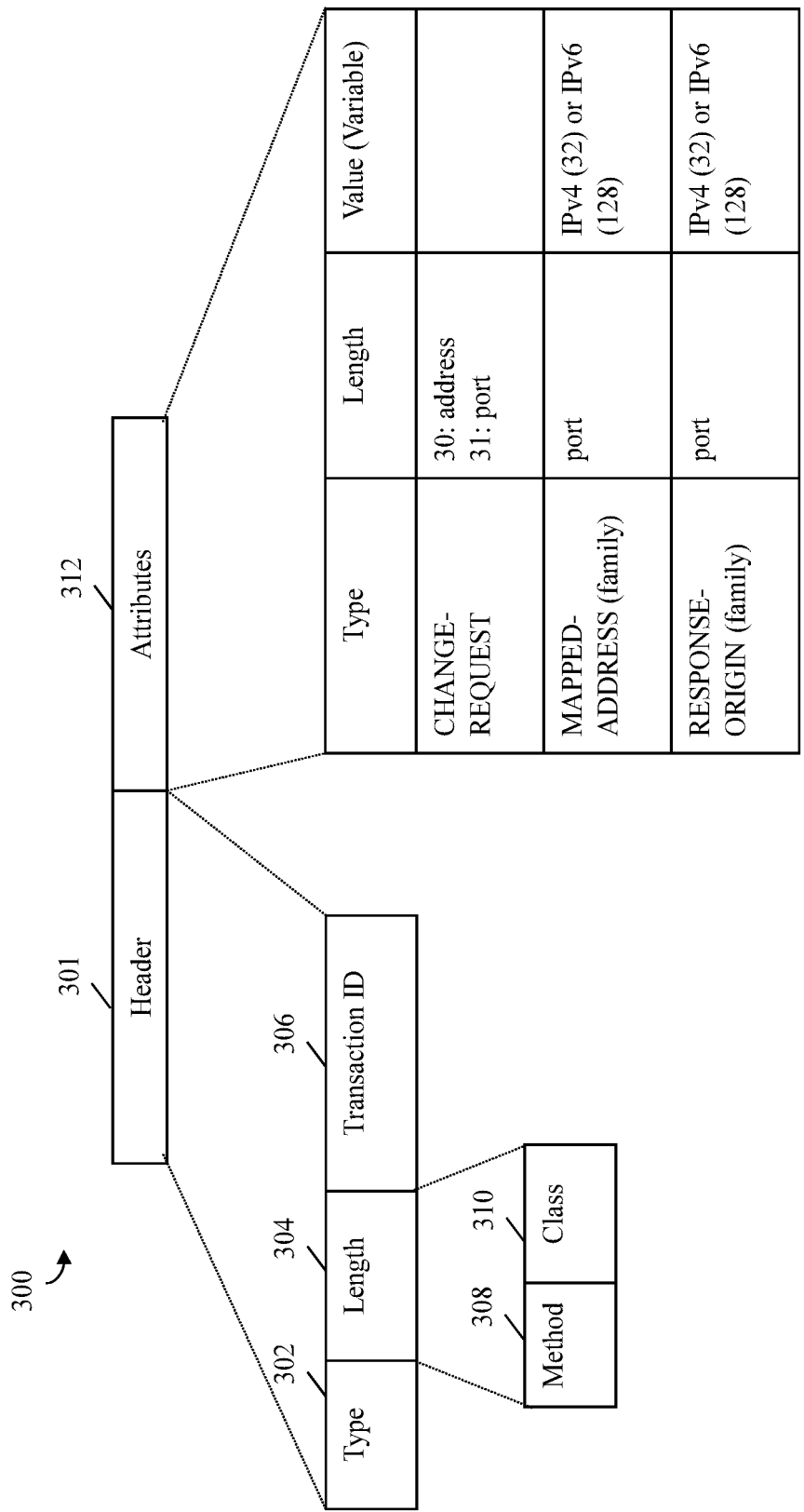
FIG. 2 is an embodiment of an E-STUN protocol message format.

FIG. 2 illustrates an embodiment of an E-STUN protocol message format 300, which may be similar in some aspects to STUN messages. The STUN messages may be encoded in binary and is further described in RFC memorandum 5389, entitled "Session Traversal Utilities for NAT (STUN)", dated October 2008, and RFC memorandum 5780, entitled "NAT Behavior Discovery Using Session Traversal Utilities for NAT (STUN)", dated May 2010, which are incorporated herein by reference as if reproduced in their entirety. The E-STUN format 300 may comprise an E-STUN header 301 and E-STUN attributes 312. The E-STUN header 301 may comprise a type field 302, length field 304, and transaction ID 306. The type field 302 and length field 304 may each be 14 and 16 bits, respectively. The transaction ID 306 may be a 96-bit number randomly selected for identification. In comparison to a conventional STUN message, a magic cookie field may be eliminated in an E-STUN message. An E-STUN message may include a subset of STUN message fields. For each field, only a subset of possible values are included. For example, E-STUN does not include 32-bit MAGIC COOKIE field. For the 12-bit Method field, only a BINDING value is included.

The length field 304 may further comprise a method field 308 and class field 310. Table 1 shows an example of binary values for the method and class sections in an E-STUN header. The method may signify the function of the transaction occurring, which may be a binding method. The binding method may be used in a request/response or in an indication transaction in order to determine the particular "binding" a NAT device has allocated to an E-STUN client or to keep other "bindings" in existence.

There may be two types of transactions in E-STUN: request/response transactions and indication transactions.

The indication transaction may be a message sent from the client or the server and generates no response. The request/response transaction may be where a client sends a request to a server, and the server returns a response. The response classes may be split into error and success responses to aid in quickly processing the E-STUN message. The different message classes and their corresponding binary values are shown in Table 1.

TABLE 1

An example of a method and class values in an E-STUN header.

| Method | Class |
| --- | --- |
| 000000000001: BINDING | 00: request |
| | 01: indication |
| | 10: success response |
| | 11: error response |

The attributes field 312 may comprise optional attributes to include in a message, which may be defined by the type, length, and variable values. The message attributes may be CHANGE-REQUEST, MAPPED-ADDRESS, and RESPONSE-ORIGIN. The CHANGE-REQUEST attribute may contain two flags to control the IP address and port used to send a response. The MAPPED-ADDRESS attribute may indicate a reflexive transport address of the client. It may comprise an 8-bit address family and a 16-bit port, followed by a fixed-length value representing the IP address. If the address family is IP version 4 (IPv4), the address may be 32 bits. If the address family is IP version 6 (IPv6), the address may be 128 bits. The RESPONSE-ORIGIN address may indicate the source IP address and port a binding response was sent from.

The E-STUN protocol may be embedded as a binary protocol or translated into another text format and embedded into HTTP or XMPP. For example, an E-STUN request and response may be embedded into URI dereference protocol (D) messages. A positive D response may contain either a success or error E-STUN response. A negative D response may contain an E-STUN error response. If D cannot return a positive response according to CHANGE-REQUEST, it may send a correlated E-STUN indication instead.

In order for a web browser to distinguish which links in a web page support the E-STUN protocol, it may be desirable for a corresponding server to advertise its E-STUN services. A server may advertise its E-STUN services implicitly by returning reflex addresses automatically during URI dereferences. For example, an HTTP response may contain a reflex address. In another embodiment, a server may advertise its E-STUN service explicitly through use of the following types of semantic tags: reflex, address, and port. A reflex tag, an address tag, and/or a port tag may be attached to different links, wherein each tag may indicate a type of service the link will provide to the client.

Regarding reflex tags, the server receiving a reflex request corresponding to the reflex tag may return IP address and port information in a response. Regarding address tags, the server receiving a request corresponding to the address tag may send an E-STUN indication from a different IP address, which may be helpful in detecting certain NAT filtering behaviors. With a port tag, a server may send an E-STUN indication from the same IP address but a different port. By using one of these tags, the server may communicate with a web browser what E-STUN services are supported during a URI dereference. Reflex tags, address tags, and port tags may collectively be referred to as semantic tags herein.

The semantic tags may be embedded in HTML5 in a myriad of ways, comprising RDFa, microformats, HTML5 rel attribute, and HTML5 microdata. RDFa may add a set of attribute-level extensions to HTML for embedding metadata within web documents. Microformat may reuse existing HTML tags to communicate metadata and other attributes in a web page. The HTML5 rel attribute may be employed to indicate a relationship between a source and a destination link. Microdata may allow a website to attach semantic information to a regular hyperlink to convey additional information about the link to the browser. For illustrative purposes, microdata may be used in the E-STUN service descriptions disclosed herein as well as for its simplicity, consistency, and extensibility.

Semantic tags may be implemented at multiple levels in order to convey which services may be requested from a server. For example, a tag may be applied to an individual URI with a URI tag, to multiple links in a page with an HTML page tag, or to an entire website with a URI authority (domain) tag as follows:

[URI tags] inherit [page tags] inherit [authority tags]

The tags may be applied at different levels by using microdata. Tagging at the domain level may enable all the links in an entire website to be tagged. The following HTTP and XMPP examples in Table 2 may be used in order to tag a URI authority whose resources support the same E-STUN services. Two lines of code are displayed for both HTTP and XMPP, wherein a reflex tag is shown within the second line of code. For the HTTP example, reflex service may be provided to the browser whenever the URI is dereferenced. Since this is a top-level link pointing to the domain, then all of the links in the domain will be tagged as well and will provide the same service. For the XMPP example, the second line of code comprises both reflex and port tags. If the URI is dereferenced, the server may return the reflex address and send a message from a different port as indicated by the tags.

TABLE 2

An example of domain level tagging in HTTP and XMPP.
Domain Level Tagging

| HTTP URI | (1) Without tag | <link href="http://www.yahoo.com"></link> |
| --- | --- | --- |
| | (2) With tag | <link rel="e-stun" itemscope itemtype="reflex" href="http://www.yahoo.com"></link> |
| XMPP URI | (1) Without tag | <link href="xmpp:john@gmail.com"></link> |
| | (2) With tag | <link rel="e-stun" itemscope itemtype="reflex port" href="xmpp:john@gmail.com"></link> |

Resources in an HTML5 page supporting the same E-STUN services may be similarly tagged at the page level as seen in Table 3 below. A tag may be added to a <body> element in an HTML page as seen in the second row of Table 3, wherein adding a body element may tag all the links in the page within the body of the code. The tag may therefore provide the reflex IP address when dereferencing the URI.

TABLE 3

An example of page level tagging in an HTML page.
Page Level Tagging (HTML)

| (1) Without tag | <html> |
| --- | --- |
| |   <head>...</head> |
| |   <body> |
| |     ... |
| |   </body> |
| | </html> |

TABLE 3-continued

An example of page level tagging in an HTML page.
Page Level Tagging (HTML)

| (2) With tag | `<html>`<br>　　`<head>`...`</head>`<br>　　`<body itemscope itemType="reflex">`<br>　　...<br>　　`</body>`<br>`</html>` |
|---|---|

E-STUN microdata tags may also be applied at the link level, either for a group of links or for individual links. For example, multiple URIs may be grouped together and tagged. An HTML5 group of resources supporting the same E-STUN services may be tagged as seen in the second line of code in Table 4 below. At the group link level, all of the URIs may provide reflex and port services as indicated by the tags.

TABLE 4

An example of group level tagging in an HTML page.
Group Level Tagging (HTML)

| (1) Without tag | `<figure>`<br>　　`<img src="http://server1/img1.jpg">my cat1</image>`<br>　　`<img src="http://server1/img2.jpg">my cat2</image>`<br>　　`<img src="http://server1/img3.jpg">my cat3</image>`<br>　　`<img src="http://server1/img4.jpg">my cat4</image>`<br>　　`<img src="http://server1/img5.jpg">my cat5</image>`<br>`</figure>` |
|---|---|
| (2) With tag | `<figure itemscope itemType="reflex port">`<br>　　`<img src="http://server1/img1.jpg">my cat1</image>`<br>　　`<img src="http://server1/img2.jpg">my cat2</image>`<br>　　`<img src="http://server1/img3.jpg">my cat3</image>`<br>　　`<img src="http://server1/img4.jpg">my cat4</image>`<br>　　`<img src="http://server1/img5.jpg">my cat5</image>`<br>`</figure>` |

Additionally, individual HTML5 and XMPP URI elements may be tagged at the link levels as seen in Table 5 below.

TABLE 5

An example of link level tagging in HTTP and XMPP.
Link Level Tagging

| HTTP URI | (1) Without tag | `<img src="http://server1/img.jpg" >my cat</image>` |
|---|---|---|
|  | (2) With tag | `<img src="http://server1/img.jpg" itemscope itemType="reflex port">my cat</image>` |
| XMPP URI | (1) Without tag | `<a href="xmpp://john@server2" >John's account</a>` |
|  | (2) With tag | `<a href="xmpp://john@server2" itemscope itemType="reflex address">John's account</a>` |

By advertising a server's E-STUN services using microdata tags, a browser may recognize that certain links provide certain features in a web page. In order for a browser to be able to use these specific features (e.g., reflex or port service), further description is needed. The HTTP 1.1 protocol is described in RFC memorandum 2616, entitled "Hypertext Transfer Protocol—HTTP/1.1", dated June 1999, which is incorporated herein by reference as if reproduced in its entirety, and an embedment of E-STUN in HTTP 1.1 may be defined as follows.

By way of further example, there may be an image hyperlink pointing to an image, and the link may provide a reflex IP address and port indication as shown in the code below.

`<img src="http://server1/img.jpg" itemscope itemType="reflex port">my cat</image>`

Since it is an HTTP hyperlink, the client (e.g., web browser 120) may dereference the URI using an HTTP protocol. In order to obtain the reflex address, the client may attach the reflex tag as a parameter sent to the URI path as seen in the following request:

```
Client sends: ?reflex=[address|port][,address|port][&tid=STRING]
GET /img.jpg?reflex HTTP 1.1
Host: server1
```

The reflex tag may be attached in order to embed the E-STUN protocol into the HTTP protocol. A text format of the E-STUN protocol may also be used in addition to a binary format, since the text format follows the semantic definition of the binary format.

After the client sends the HTTP request, the server may receive the message and go through the aforementioned procedures with the reflex agent, wherein the public IP address and port as received by the server may be embedded in the HTTP response in the server field as seen below. In this case, the public IP address 1.2.3.4 and port 9999 information may be returned to the client by the server.

```
Server responds: reflex=FAM,ADD,PORT[;origin=FAM,ADD,PORT]
HTTP 1.1 200 OK
Server: reflex=IPv4, 1.2.3.4, 9999
...
```

In another transaction, suppose the client wants to use the port feature by asking the server to return an indication message from a different port with the same reflex address. The client may then create the following request and send it to the server:

```
Client sends:
GET /img.jpg?reflex=port&tid=1234 HTTP 1.1
Host: server1
```

The "tid" portion of the above request may be the transaction ID (e.g., "1234") created by the client and may be used to correlate the request message with the indication message from the server which may be sent back asynchronously. Once the server has received the message, it may send the following response message with the requested reflex IP address and the E-STUN indication from a different port, using the transaction ID from the client. The format for the E-STUN indication message is not shown below, since the format may be encoded in different ways (e.g., binary or text formats).

```
Server responds:
HTTP 1.1 200 OK
Server : reflex=IPv4, 1.2.3.4, 9999
...
E-STUN Indication from different port
(Transaction ID = 1234)
```

The request and response messages (e.g., EQ and ER messages) shown above may be embedded inside Q' and R' message to pass through proxies. The E-STUN protocol embedment in HTTP may also be applicable to WebSocket and Server-Sent Event as this technology uses HTTP 1.1 for handshakes. The WebSocket protocol is described in RFC memorandum 6455, entitled "The WebSocket Protocol", dated December 2011, which is incorporated herein by reference as if reproduced in its entirety.

Additionally, the E-STUN protocol may be embedded in XMPP and may be shown in a single transaction between a client and server. The XMPP protocol is described in RFC memorandum 3920, entitled "Extensible Messaging and Presence Protocol (XMPP): Core", dated October 2004, which is incorporated herein by reference as if reproduced in its entirety. Suppose there is a hyperlink pointing to an XMPP URI indicating that the URI may provide reflex and address service as shown in the code below.

<a href="xmpp://john@server2" itemscope itemType="reflex address">John's account</a>

Since it is an XMPP hyperlink, the client may dereference the URI using an XMPP protocol. The client may initiate a stream to a server by sending the following message:

```
Client sends:
<stream:stream ...>
```

The server may respond with the following message to complete the handshake as defined in RFC 3920:

```
Server responds:
<stream:stream id="123" ...>
<stream:features>...</stream:features>
```

The client may then ask the server to return a reflex address in response, along with an E-STUN indication from a different address. Thus, the client may send the following authentication request, which may comprise an embedded address request:

```
Client sends:
<auth xmlns="urn:ietf:params:xml:ns:xmpp-sasl" mechanism="PLAIN">
<reflex tid="1234">address</reflex>
</auth>
```

Once the server has received the request, it may respond with the requested reflex IP address and the E-STUN indication from a different address, as seen in the following messages:

```
Server responds:
<success xmlns="urn:ietf:params:xml:ns:xmpp-sasl">
<reflex family="IPv4" address="1.2.3.4" port="9999"/>
</success>
E-STUN Indication from different address
(Transaction ID = 1234)
```

The request and response messages (e.g., EQ and ER messages) shown above may be embedded inside Q' and R' messages to reuse XMPP authentication. Similarly to the HTTP E-STUN embedment, the transaction ID may be used in the request and response messages from the client and server, respectively, for identification purposes. The format of the E-STUN message may also be encoded in binary or text formats as desired.

Ultimately, the XMPP E-STUN embedment may be implemented similarly to the aforementioned HTTP E-STUN embedment with minor modifications due to the differences in protocols. However, the E-STUN functions may remain the same, wherein a URI may advertise to a client its E-STUN services, and a client may decide which services to utilize by communicating with a server. By embedding E-STUN in XMPP or HTML, the XMPP or HTML authentication may be reused without requiring any special login to the E-STUN server or other formalities.

In order for a client to be able to communicate with a server, it may be necessary to determine the type of NAT employed in between the two. Obtaining E-STUN indication messages from different servers/ports may be important for differentiating between various NAT mapping and filtering behaviors. For example, one type of NAT may receive a message from a server only if an internal client has sent a message to that server before. If the server has never been contacted, the NAT may not allow the server to send a message to the client from outside the private network. In order to reveal if a NAT has this type of behavior, a server may be instructed to send a message back to a client to determine if the NAT allows it to do so. If the message is not sent, the NAT may control this behavior whereas if the message is sent, the NAT may allow the message to go through. These may be examples of two different NAT filtering behaviors, wherein the filtering behavior may determine how a NAT decides to let outside traffic in to a private network containing the client of interest.

In order to differentiate between the different NAT mapping and filtering behaviors, a client such as a web browser may collect all kinds of data from different servers with different properties. For example, a browser may collect the reflex IP address and other indication messages from one server, while the browser may not receive indication messages from another server. Once the browser has collected enough data, the browser may determine if there is a NAT and if so, what type of NAT is in use.

Figure 3:
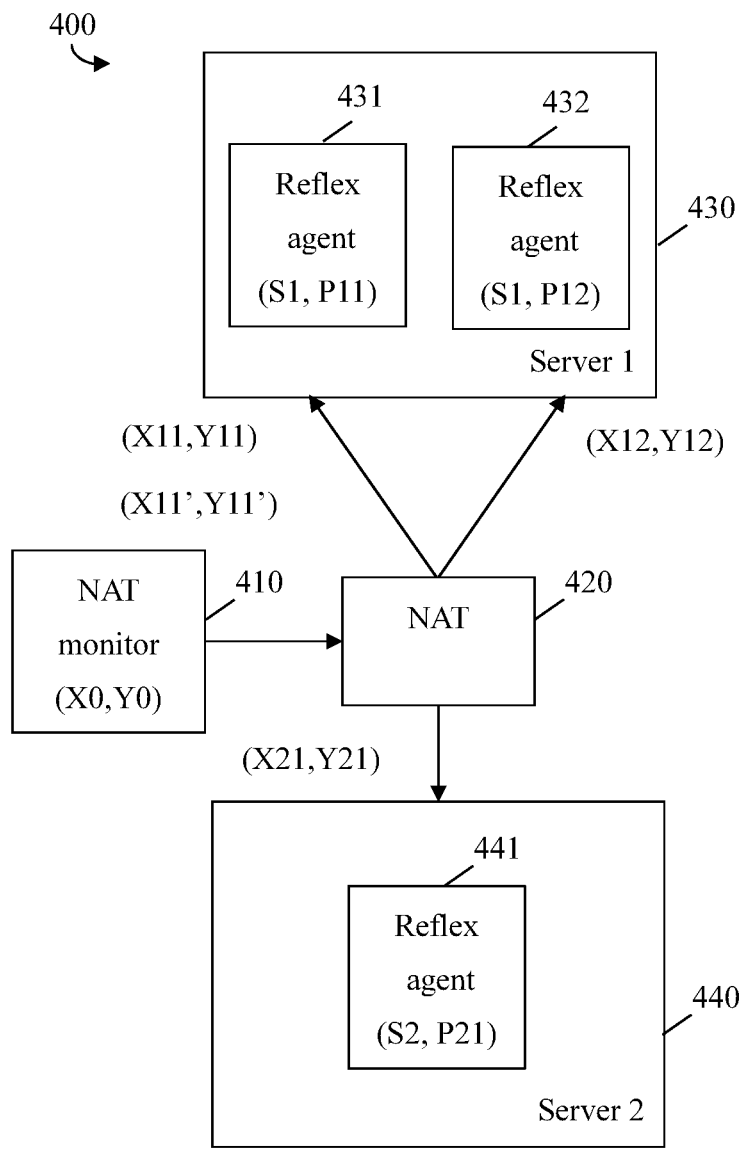
FIG. 3 illustrates an embodiment of communication in a networked architecture for determining NAT mapping behavior.

There may be two types of NAT behaviors, which may be classified according to RFC memorandums 4787 and 5382. The first type of behavior may be identified by how a NAT maps an internal IP address to an external IP address. FIG. 3 illustrates an embodiment of communication in a networked architecture 400 for determining NAT behavior. The architecture 400 may comprise a NAT monitor 410, NAT 420, server 1 430, server 2 440, and a plurality of reflex agents 431, 432, and 441. The NAT monitor 410 may be the same as the NAT monitor module 126 as described earlier (e.g., the NAT monitor 410 may be part of a web browser). The NAT 420 may be the same as the NAT device 130 described earlier. For the architecture 400, there may be any number of components in a NAT monitoring system. That is, there may be n IP addresses and m ports, wherein m≥n≥1. Ports may be represented as Pij, in which i designates a specific address for i=1, 2, ..., n, and j designates a specific port for j=1, 2, ..., m. For illustrative purposes in the architecture, there may be two servers (430 and 440), wherein server 1 430 may have one address and two ports and server 2 440 may have one address and one port. Reflex agent 431 may be located at server 1, port 1 (S1,P11), reflex agent 432 may be located at server 1, port 2 (S1,P12), and reflex agent 441 may be located at server 2, port 1 (S2,P21). These reflex agents may be similar to the E-STUN agents 146 and 156 shown in FIG. 1.

The NAT monitor 410 may be a module inside a web browser, wherein (X0,Y0) may be the internal private IP address of the browser. The NAT monitor 410 may collect reflex public IP addresses from server 1 430 and server 2 440, wherein some of the IP addresses may be collected from different ports such as P11, P12, and P21. The collected information from each of the servers may be represented as (X,Y) pairs, wherein X is the IP address and Y is the port. For example, (X11,Y11) may be collected from server 1, port 1 (S1,P11), (X12,Y12) may be collected from server 1, port 2 (S1,P12), and (X21,Y21) may be from server 2, port 1 (S2, P21). (X11',Y11') may be another instance of a reflex address and port information collected from (S1,P11). For example, this information may have been collected from the same server but in a different transaction that may have occurred at a different time.

(X11,Y11), (X11',Y11'), (X12,Y12), and (X21,Y21) may be five data points (including the private IP address) collected by the NAT monitor 410 from the servers, and (X0,Y0) is the private IP address and port of a browser comprising the NAT monitor 410 and therefore known by the NAT monitor 410. The reflex IP addresses from the different servers and ports may be collected using the reflex tag in URI dereferences, wherein each server and all ports (Pij) are distinct (e.g., server 1≠server 2). These data points may be sufficient for the NAT monitor 410 to make a prediction of the NAT behavior according to Internet Engineering Task Force (IETF) classification. Referring to FIG. 3, a method or process for determining behavior of a NAT, such as NAT 420, is as follows. First, the NAT monitor 410 may determine whether or not a NAT is present by checking if (X0,Y0), (X11,Y11), and (X21, Y21) are all equal to each other. If the internal and external IP addresses are all the same, then there may be no translation occurring, e.g., no NAT. If there are differences between the addresses, then the presence of a NAT may be confirmed, and the type of NAT mapping may be discovered with further analysis.

There may be four different classifications for how a NAT performs mapping, which may be endpoint-independent mapping (EIM), address-dependent mapping (ADM), address and port dependent mapping (APDM), and connection dependent mapping (CDM). To determine the classification, the NAT monitor 410 may check if (X11,Y11) is equal to (X21,Y21). If so, the NAT may employ EIM, in which the NAT reuses port mapping for subsequent packets sent from the same internal IP address and port to any external IP address and port. In EIM, the NAT may assign a fixed public address, wherein server 1 and server 2 may have the same IP address. If (X11,Y11) is not equal to (X21,Y21), the NAT may either use ADM or APDM. In order to distinguish between these mappings, the NAT monitor 410 may check if (X11,Y11) is equal to (X12,Y12). If the two data points are the same, then the NAT may utilize ADM, in which the NAT reuses the port mapping for subsequent packets sent from the same internal IP address and port to the same external IP address, regardless of the external port. If (X11,Y11) is not equal to (X12,Y12), then the NAT may either use APDM or CDM. The NAT monitor 410 may make a final distinction between the two by checking if (X11,Y11) is equal to (X11', Y11'). If the data points are the same, then the NAT may utilize APDM, in which the NAT reuses the port mapping for subsequent packets sent from the same internal IP address and port to the same external IP address and port while the mapping is still active. If the data points are unequal, then the NAT may exhibit CDM, wherein a new mapping is allocated by the NAT for each connection.

From the method, a sufficient number of data points may be obtained to make an accurate prediction about a NAT and its mapping behavior. If there are not two servers, the presence of a NAT may still be determined. Similarly, if there are not different ports for a single server, the NAT monitor may at least detect if the mapping is EIM or not. The method for determining NAT mapping behavior as described earlier may be summarized in Table 6.

TABLE 6

Summary of method for determining NAT mapping behavior. Determining NAT Mapping Behavior

| | |
|---|---|
| 1 | A NAT monitor may collect IP addresses from different servers and ports via URI dereferences. (X0,Y0), (X11,Y11), (X11',Y11'), (X12, Y12), and (X21,Y21) may be five data points obtained. |
| 2 | If (X0,Y0), (X11,Y11), and (X21,Y21) are all equal to each other, then there is no NAT occurring. If the addresses are different, then NAT is present and the type of NAT may be determined in the following steps. |
| 3 | If (X11,Y11) = (X21,Y21), then the NAT is EIM. If they are unequal, then the NAT may either be ADM or APDM. |
| 4 | If (X11,Y11) = (X12,Y12), then the NAT is ADM. If they are unequal, then the NAT may either be APDM or CDM. |
| 5 | If (X11,Y11) = (X11',Y11'), then the NAT is APDM. If they are unequal, then the NAT is CDM. |

The second type of NAT behavior may be identified by how a NAT allows outside traffic in and what kind of filtering is performed. A NAT may arbitrarily combine a type of mapping behavior with any type of filtering behavior. That is, the two types of behaviors may be independent of each other, and there may be no correlation between the two. Thus, mapping and filtering behaviors may be detected separately.

Figure 4:
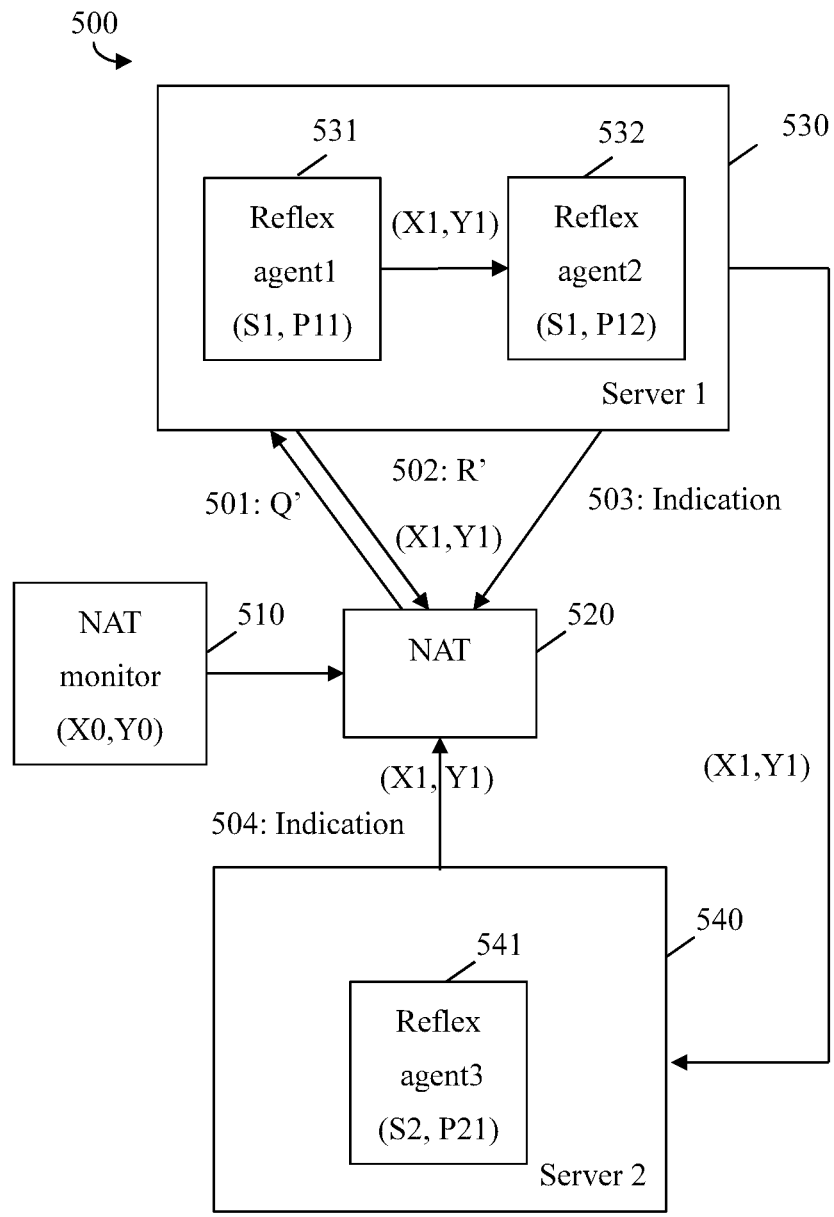
FIG. 4 illustrates an embodiment of communication in a networked architecture for determining NAT filtering behavior.

FIG. 4 illustrates an embodiment of communication in a networked architecture 500 for determining behavior of a NAT. The architecture 500 may comprise a NAT monitor module 510, NAT 520, server 1 530, server 2 540, and a plurality of reflex agents 531, 532, and 541. For the architecture, there may be any number of components in a NAT monitoring system. That is, there may be n IP addresses and m ports, wherein m≥n≥1. Ports may be represented as Pij, in which i designates a specific address for i=1, 2, . . . , n, and j designates a specific port for j=1, 2, . . . , m. For illustrative purposes, there may be two servers (530 and 540), wherein server 1 530 may have one address and two ports and server 2 540 may have one address and one port. Reflex agent 531 may be located at server 1, port 1 (S1,P11), reflex agent 532 may be located at server 1, port 2 (S1,P12), and reflex agent 541 may be located at server 2, port 1 (S2,P21). These reflex agents may be similar to the reflex agents 146 and 156 shown in FIG. 1.

The NAT monitor 510 may be a module inside a web browser, wherein (X0,Y0) may be the private IP address and port of the browser. Referring to FIG. 4, a method or process for determining a filtering behavior of a NAT, such as NAT 520, is as follows. In this filtering method, the NAT monitor 510 may determine which server may or may not send messages through the NAT 520 back to the web browser. From this information, the NAT monitor 510 may make a prediction on what type of filtering behavior is employed by the NAT 520. There may be three types of filtering behavior as defined in, for example, RFC 4787 and RFC 5382. Three types of filtering behavior are endpoint-independent filtering (EIF), address-dependent filtering (ADF), and address and port dependent filtering (APDF). In the first step 501 of the filtering method, a web browser, such as browser 120, may send a URI dereference request Q' (embedded E-STUN message) to agent 531 and ask agent 531 to return an address/port pair (X1,Y1). The browser may also ask agent 531 to facilitate return of a first indication (the first indication being a message) from a different port (e.g., P12) through use of a port tag, wherein the first indication includes the address/port pair (X1,Y1). Further, the browser may also ask reflex agent 531 to facilitate return of a second indication from a different address (e.g., from server 2) as indicated through use of an address tag, wherein the second indication includes the address/port pair (X1,Y1). In the second step 502, reflex agent 531 may return the address/port pair (X1,Y1) in a URI dereference response R' (embedded E-STUN message) from port P11. These requests may be made depending on the advertised E-STUN service in order to determine if they may be completed successfully. In a third step 503, the reflex agent 532 may send the requested indication from port P12. The indication may include the address/port pair (X1,Y1). In a fourth step 504, the server 540 may return the second indication from port P21. In order to facilitate the second indication, the use of the address tag may trigger server 530 to request that server 540 return the second indication. More specifically, reflex agent 531 may contact reflex agent 541 to ask or request reflex agent 541 to send the second indication to the web browser comprising the NAT monitor 510. The second indication may include the address/port pair (X1,Y1), as indicated in the request from the reflex agent 531.

Depending on the type of NAT, the first and/or second indications may not be received by the NAT monitor 510 within a predetermined timeout period. If the second indication is received by the NAT monitor 510 from reflex agent 541 within the timeout period, then the NAT behavior may be classified as EIF, which may indicate that the NAT forwards any packets destined to the internal address and port, regardless of the external IP address and port source. That is, in EIF behavior, sending packets from the internal side of the NAT 520 to any external IP address may be sufficient to allow any packets back to the internal endpoint. If the indication message has not been received within a timeout period from reflex agent 541, then the NAT monitor 510 may check if the message has been received within a timeout period from reflex agent 532. If so, the NAT behavior may be classified as ADF, which may indicate that the NAT may filter out packets from a server destined for the internal endpoint if packets have not been sent from the internal side to the external IP address previously (independently) of the port used by the external server). That is, in ADF behavior, it may be necessary for the internal endpoint to send packets first to a specific external endpoint's IP address before it may receive packets for that external endpoint. If the message has still not been received within a timeout period from reflex agent 532, then the NAT behavior may be classified as APDF, which may be similar to ADF, except that the external port may be relevant for filtering. That is, in APDF behavior, it may be necessary for the internal endpoint to send packets first to a specific external endpoint's IP address and port before it may receive packets from that external endpoint.

Table 7 below summarizes the method for determining NAT filtering behavior described above as follows.

TABLE 7

Summary of method for determining NAT filtering behavior. Determining NAT Filtering Behavior 1 A web browser may send a URI dereference request to a reflex agent 531 and ask it to return a reflexive address (X1,Y1) and two indications from a different port and a different address.
2 The reflex agent 531 may return the reflexive address and ask a second and third reflex agent (532 and 541) to send indications from a different port and address/server.
3 If an indication message is received within a timeout period from reflex agent 541, then the NAT filtering behavior is EIF.
4 If the indication message is received within a timeout period from reflex agent 532, then the NAT filtering behavior is ADF.
5 If the message has not been received within a timeout period from reflex agent 532, then the NAT filtering behavior is APDF.

Figure 5:
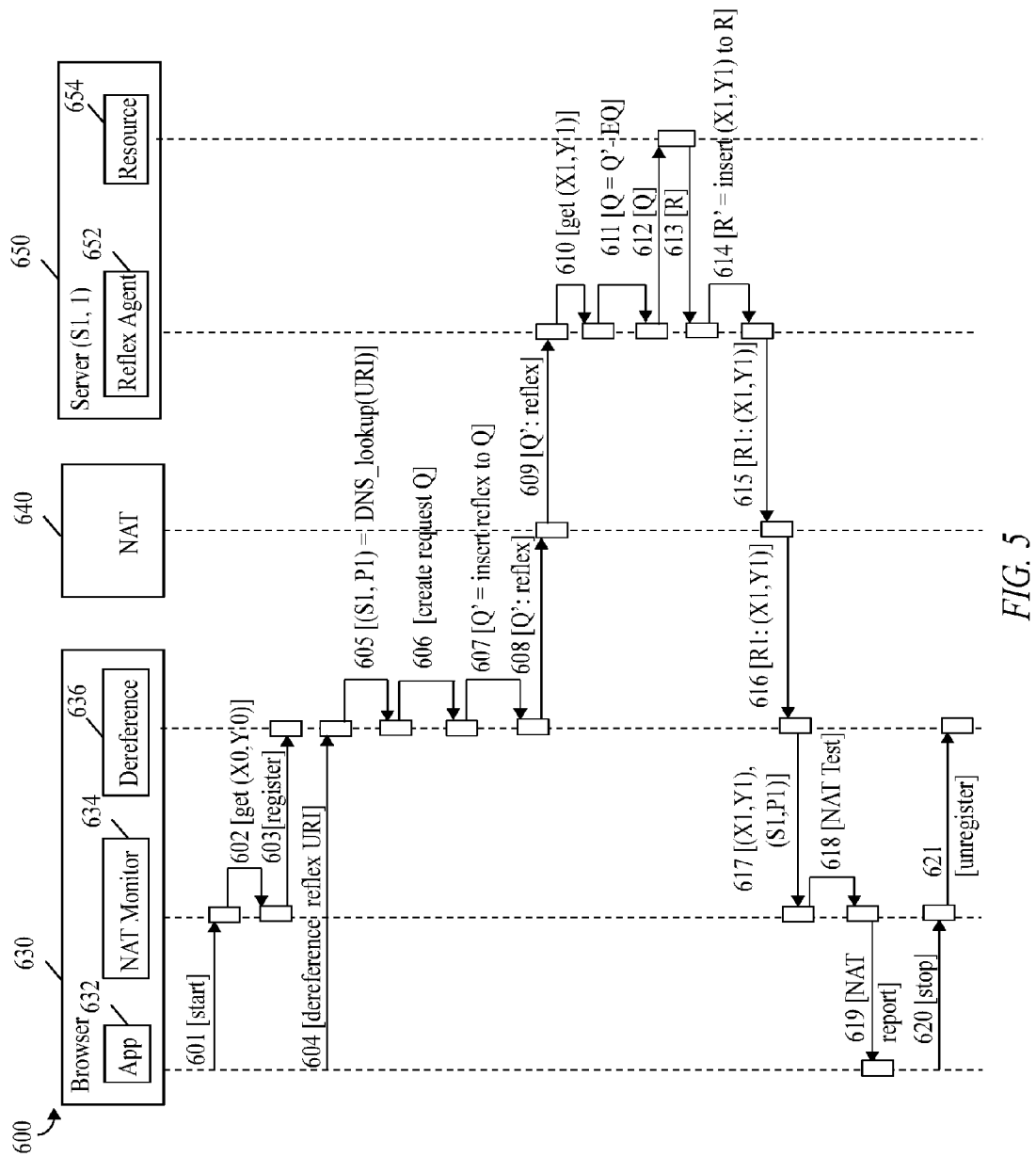
FIG. 5 is a protocol diagram illustrating an embodiment of a method for determining NAT filtering and/or mapping.

FIG. 5 is a protocol diagram 600 illustrating an embodiment of a method for determining NAT filtering and/or mapping. The diagram 600 shows a sequence of steps for communication between a web browser 630, a NAT 640, and a web server 650. The web browser 630 may comprise a web application 632, a NAT monitor 634, and a dereference protocol module 636. The server 650 may comprise a reflex agent 652 and a resource 654. The web browser 630 may be the same as the web browser 120 described earlier; the NAT 640 may be the same as the NAT device 130 described earlier, and the web server 650 may be the same as the HTTP server 140 or XMPP server 150 described earlier. The sequence of steps in diagram 600 may commence at step 601 with an initial request from a web application 632. A web application 232 may be, for example, a video conference or a multi-player game application. At step 602, the NAT monitor 634 may obtain the private IP address (X0,Y0) of web browser 630. In step 603, the IP address may be registered at the dereference protocol module 636. In step 604, a URI deference may be performed in which a reflex tag may be utilized. The URI being dereferenced may be HTTP or XMPP, and transport messages may employ TCP or UDP. Next, the dereference module 636 at step 605 may use a Domain Name Service (DNS) lookup to obtain an IP address of a domain. A server and port pair indicated by (S1,P1) may be received at the dereference module 636. At steps 606 and 607, the dereference module 636 may create request Q and subsequently embed the E-STUN protocol along with the reflex tag in the regular request message, resulting in Q'. The Q' message may then be sent to the NAT 640 in step 608 and then forwarded to the reflex agent 652 in step 609. The NAT 640 may map the private IP address information (X0,Y0) to a public address (X1,Y1) which may be seen by server 650. The reflex agent 652 may be referred to as an E-STUN agent such as components 146 and 156 shown in architecture 100.

At step 610, the reflex agent 652 may obtain the public IP address (X1,Y1) from the NAT 640. The agent 652 may then decode Q' in step 611 by removing the embedded E-STUN portion from the message. In steps 612 and 613, the decoded message Q may be sent to the resource 654 which may be an HTTP server, and the response message R may be sent back to the reflex agent 652. At step 614, the reflex agent 652 may insert (X1,Y1) IP address into the response, resulting in R'. The R' response may then be sent back to the web browser 630 via the NAT 640 in steps 615 and 616. The dereference protocol module 636 may obtain the R' response, extract the (X1,Y1) information, and send the public IP address to the NAT monitor 634 in steps 617 and 618. In step 618 NAT mapping and/or filtering tests may be performed, such as the tests for determining NAT mapping and/or filtering behavior as previously described with respect to FIGS. 3 and 4 and summarized in Tables 6 and 7. Next, in step 619 a NAT report containing the IP addresses and additional information about the NAT may be sent to the application 632. In step 620, the application 632 tells the NAT monitor 634 to cease testing or stop. In step 621, the NAT monitor may be unregistered at the dereference module 636, which means the NAT monitor 634 tells the dereference engine to stop collecting reflex IP addresses.

Figure 6:
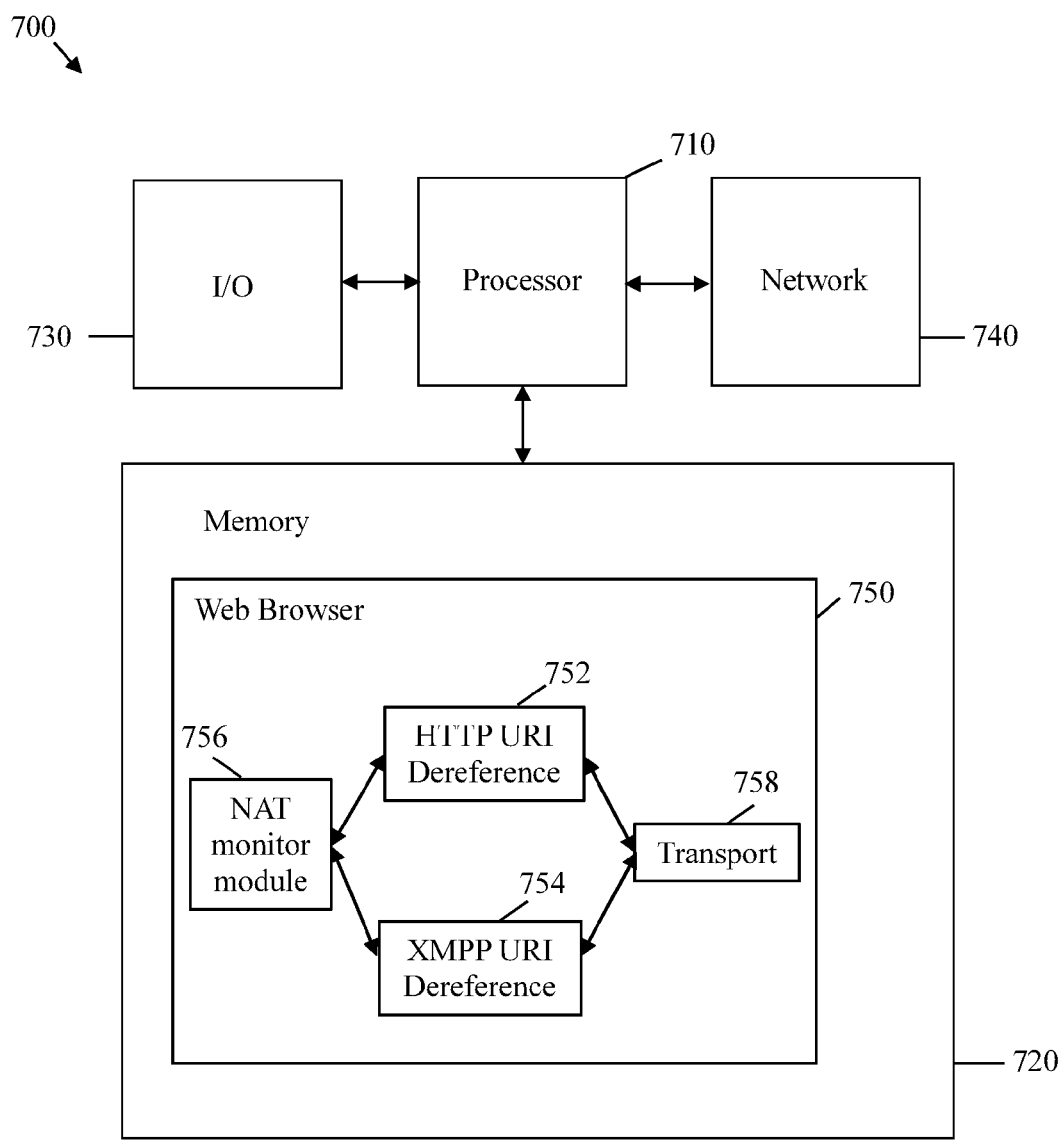
FIG. 6 illustrates an embodiment of a server.

FIG. 6 illustrates an embodiment of a computer system or server 700, which may be suitable for implementing one or more embodiments of the components or modules disclosed herein, such as the web browser 120 described above. The server 700 includes a processor 710 that is in communication with memory 720, input/output (I/O) devices 730, and network device 740. Although illustrated as a single processor, the processor 710 is not so limited and may comprise multiple processors. The processor 710 may be implemented as one or more central processor unit (CPU) chips, cores (e.g., a multicore processor), field-programmable gate arrays (FPGAs), application specific integrated circuits (ASICs), and/or digital signal processors (DSPs). The processor 710 may be configured to implement any of the schemes described herein, including the methods for determining NAT filtering and/or mapping. The processor 710 may be implemented using hardware or a combination of hardware and software.

The memory 720 may comprise secondary storage, random access memory (RAM), read-only memory (ROM), or any combination thereof. Secondary storage may comprise one or more disk drives or tape drives and is used for non-volatile storage of data and as an over-flow data storage device if the RAM is not large enough to hold all working data. The secondary storage may be used to store programs that are loaded into the RAM when such programs are selected for execution. The ROM may be used to store instructions and perhaps data that are read during program execution. The ROM may a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The network device 740 (sometimes referred to as a transceiver) may serve as an output and/or input device of the network node. For example, if the network device 740 is acting as a transmitter, it may transmit data out of the network node. If the network device 740 is acting as a receiver, it may receive data into the network node. Further, the network device 740 may include one or more optical transmitters, one or more optical receivers, one or more electrical transmitters, and/or one or more electrical receivers. The network device 740 may take the form of modems, modem banks, Ethernet cards, universal serial bus (USB) interface cards, serial interfaces, token ring cards, fiber distributed data interface (FDDI) cards, and/or other well-known network devices. The network device 740 may enable the processor 710 to communicate with an Internet or one or more intranets. The messages described herein may be transmitted or received by the network device 740.

The I/O devices 730 may be optional or may be detachable from the rest of the server 700. The I/O devices 730 may include a video monitor, liquid crystal display (LCD), touch screen display, or other type of display. The I/O devices 730 may also include one or more keyboards, mice, or track balls, or other well-known input devices.

It is understood that by programming and/or loading executable instructions onto the server 700, at least one of the processor 710 or the memory 720 are changed, transforming the server 700 in part into a particular machine or apparatus, e.g., a web browser 750 comprising a NAT monitor module 756, an HTTP URI dereference module 752, an XMPP URI dereference module 754, and a transport module 758, having the functionality taught by the present disclosure. The web browser 750 may, for example, be the same as web browser 120 or 630 and may perform the steps for web browser 630 shown in FIG. 5. Messages received by the network device 740 may be acquired by the web browser 750. Further, the server 700 may instead be a web server, such as web servers 140, 150, or 650 described earlier, in which case the memory 720 may store instructions for a reflex agent, such as reflex agents, 146, 156, or 652 described earlier. The executable instructions may be stored on the memory 720 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain into the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing the processor, such as processor 710, to execute a computer program. In this case, a computer program product can be provided to a server, such as server 700, using any type of non-transitory computer readable media, such as memory 720. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method performed in a web browser, the method comprising:
    dereferencing a Uniform Resource Identifier (URI) comprising a web resource and a reflex tag;
    creating a request message comprising a request for the web resource and a reflex request corresponding to the reflex tag, wherein the reflex request is a request for address and port information from a web server comprising the web resource;
    encapsulating the request message in a transport message comprising an Internet Protocol (IP) address and a port of the web browser;
    transmitting the transport message to the web server;
    receiving a response message from the web server, wherein the response message comprises a second IP address and a second port number of the browser as seen by the web server, wherein the second IP address and the second port number is the requested address and port information, and wherein the response message further comprises at least a part of the web resource; and
    determining a characteristic of at least one Network Address Translation (NAT) device coupled between the web browser and the web server based on the second IP address and the second port number.

2. The method of claim 1, wherein the characteristic of the at least one NAT device is a mapping behavior or a filtering behavior.

3. The method of claim 2, further comprising:
    receiving a second response message from the web server, wherein the second response message comprises a third IP address and third port number of the browser as seen by the web server;
    receiving a third response message from a second web server, wherein the third response message comprises a fourth IP address and fourth port number of the browser as seen by the second web server, wherein the at least one NAT device is coupled between the web browser and the second web server;
    determining that the at least one NAT device is present by comparing the IP address, the second IP address, and the fourth IP address and by comparing the port, the second port, and the fourth port.

4. The method of claim 3, further comprising:
    determining that the at least one NAT device is an endpoint-independent mapping (EIM) NAT by comparing the second IP address and the fourth IP address and by comparing the second port to the fourth port.

5. The method of claim 3, further comprising:
    determining that the at least one NAT device is an address-dependent mapping (ADM) NAT device by comparing the second IP address and the third IP address and by comparing the second port and the third port.

6. The method of claim 1, wherein the URI further comprises a port tag and an address tag, wherein the request message further comprises a port request corresponding to the port tag and an address request corresponding to the address tag, wherein the method further comprises:
    receiving a second response message from a second web server within a timeout period, wherein the second response message comprises the second IP address and the second port number; and
    determining that the at least one NAT device is an address-dependent filtering (ADF) NAT device based on the second response message.

7. The method of claim 1, wherein the URI is a Hypertext Transfer Protocol (HTTP) or an Extensible Messaging and Presence Protocol (XMPP) URI, and wherein the transport message is a Transmission Control Protocol (TCP) message or a User Datagram Protocol (UDP) message.

8. The method of claim 1, wherein the reflex tag is embedded in the URI using one of the following: Hypertext Markup Language version 5 (HTML5) microdata, Resource Description Framework in attributes (RDFa), microformat, and HTML5 rel attribute.

9. The method of claim 8, wherein the reflex tag is represented as HTML5 or Extensible Messaging and Presence Protocol (XMPP) microdata at one of a plurality of levels in the web browser, comprising a domain level, a page level, a group level, and a link level.

10. A method performed in a web server, the method comprising:
    receiving a transport message, wherein the transport message is an encapsulated request message, wherein the request message comprises a request for a web resource and a reflex request corresponding to a reflex tag from a web browser, and wherein the transport message comprises an Internet Protocol (IP) address and a port number generated by at least one Network Address Translation (NAT) device for the web browser;

in response to receiving the request for the web resource, retrieving the web resource;

in response to receiving the reflex request, inserting the IP address and the port number in a response message, wherein the response message further comprises at least a part of the web resource; and transmitting the response message to the web browser.

11. The method of claim 10, wherein the response message is used to determine a mapping behavior or a filtering behavior of the at least one NAT device coupled between the web server and the web browser.

12. The method of claim 10, wherein the request message further comprises a port request corresponding to a port tag, wherein the transport message is received by a first reflex agent, wherein in response to receiving the port request asking, by the first reflex agent, a second reflex agent at a second port in the web server to send an indication from the second port to the web browser, wherein the indication includes the IP address and the port number.

13. The method of claim 12, wherein the indication promotes determination of a filtering behavior of the at least one NAT device.

14. The method of claim 10, wherein the request message further comprises an address request corresponding to an address tag, wherein the transport message is received by a first reflex agent, wherein in response to receiving the port request, asking, by the first reflex agent, a second reflex agent in a second server to send an indication to the web browser, wherein the indication includes the IP address and the port number.

15. The method of claim 10, wherein the transport message is a Transmission Control Protocol (TCP) message or User Datagram Protocol (UDP) message, and wherein the web server is a Hypertext Transfer Protocol (HTTP) server or an Extensible Messaging and Presence Protocol (XMPP) server.

16. The method of claim 10, wherein the method further comprises:

receiving a second transport message, wherein the second transport message is an encapsulated second request message, wherein the second request message comprises a request for a second web resource from a second web browser, wherein the second request message does not include any reflex request; and in response to receiving the request for the second web resource:

retrieving the second web resource;

inserting the IP address and the port number in a second response message to advertise the ability to respond to reflex requests, wherein the response message further comprises at least a part of the second web resource; and transmitting the second response message to the second web browser.

17. A computer program product comprising computer executable instructions stored on a non-transitory computer readable medium such that when executed by a processor cause a web browser to:

dereference a hyperlink identifying a web resource with a reflex tag;

create a request message comprising a request for the web resource and a reflex request corresponding to the reflex tag, wherein the reflex request is a request for address and port information from a web server comprising the web resource; and encapsulate the request message in a transport message comprising an Internet Protocol (IP) address and a port of the web browser;

send the transport message to the web server;

acquire a response message from the web server, wherein the response message comprises a second IP address and a second port number of the browser as seen by the web server, wherein the second IP address and the second port number is the requested address and port information, and wherein the response message further comprises at least a part of the web resource; and determine a presence of and a type of at least one Network Address Translation (NAT) device coupled between the web browser and the web server based on the second IP address and the second port number.

18. The computer program product of claim 17, further comprising instructions causing the web browser to:

acquire a second response message from the web server, wherein the second response message comprises a third IP address and third port number of the browser as seen by the web server;

acquire a third response message from a second web server, wherein the third response message comprises a fourth IP address and fourth port number of the browser as seen by the second web server, wherein the at least one NAT device is coupled between the web browser and the second web server; and determine that the at least one NAT device is present by comparing the IP address, the second IP address, and the fourth IP address and by comparing the port, the second port, and the fourth port.

19. The computer program product of claim 18, further comprising instructions causing the web browser to:

determine that the at least one NAT device is an endpoint-independent mapping (EIM) NAT device by comparing the second IP address and the fourth IP address and by comparing the second port to the fourth port;

else determine that the at least one NAT device is an address-dependent mapping (ADM) NAT device by comparing the second IP address and the third IP address and by comparing the second port and the third port.

20. The computer program product of claim 17 wherein the URI further comprises a port tag and an address tag, wherein the request message further comprises a port request corresponding to the port tag and an address request corresponding to the address tag, wherein the computer program product further comprises instructions causing the web browser to:

acquire a second response message from a second web server within a timeout period, wherein the second response message comprises the second IP address and the second port number; and determine that the at least one NAT device is an address-dependent filtering (ADF) NAT device based on the second response message.

* * * * *